(12) United States Patent
Pryor et al.

(10) Patent No.: US 8,184,152 B2
(45) Date of Patent: May 22, 2012

(54) CAMERA-HOLDING APPARATUS FOR EVALUATING PARTS

(75) Inventors: John M. Pryor, Lake Forest Park, WA (US); David P. Banks, Lake Stevens, WA (US); Stephen D. Friddell, Issaquah, WA (US); Nancy J. McGinnis, Normandy Park, WA (US)

(73) Assignee: The Boeing Company, Chicago, IL (US)

( * ) Notice: Subject to any disclaimer, the term of this patent is extended or adjusted under 35 U.S.C. 154(b) by 623 days.

(21) Appl. No.: 12/325,680

(22) Filed: Dec. 1, 2008

(65) Prior Publication Data

US 2010/0134613 A1 Jun. 3, 2010

(51) Int. Cl.
*H04N 7/18* (2006.01)
(52) U.S. Cl. .............. 348/92; 349/95; 356/394
(58) Field of Classification Search .......... 348/86, 348/92, 95; 382/141; 356/388, 394
See application file for complete search history.

(56) References Cited

U.S. PATENT DOCUMENTS

| 4,809,066 | A | 2/1989 | Leberl et al. | |
|---|---|---|---|---|
| 5,969,810 | A * | 10/1999 | Nicks et al. | 356/239.4 |
| 6,762,422 | B2 * | 7/2004 | Yamaguchi et al. | 250/491.1 |
| 6,885,449 | B1 * | 4/2005 | Cook | 356/394 |
| 6,950,545 | B1 * | 9/2005 | Nomoto et al. | 382/141 |
| 7,825,824 | B2 * | 11/2010 | Shrum, Jr. | 340/902 |
| 2008/0075351 | A1 | 3/2008 | Smith | |
| 2008/0141777 | A1 | 6/2008 | Engelbart et al. | |
| 2008/0259325 | A1 | 10/2008 | Engelbart et al. | |
| 2008/0267441 | A1 * | 10/2008 | Bux et al. | 382/100 |

FOREIGN PATENT DOCUMENTS

| DE | 4307590 | | 3/1993 |
| GB | 1332108 | | 10/1973 |
| GB | 2338786 | A | 12/1999 |
| JP | 11063925 | | 8/1997 |
| WO | 2005/057127 | | 6/2005 |

OTHER PUBLICATIONS

Big C website http://www.bigc.com/products_handheld.php © 2006.
Intellectual Property Office of Great Britian; Combined Search and Examination Report for Patent Application No. GB0920619.4 (Report issued Feb. 11, 2010).
Smith, Kennedy; "Shedding Light on Optical Comparators" Copyright 2002 QCI International, http://www.qualitydigest.com/may02/html/optcomp.html.
Wikipedia "Optical comparator" Feb. 25, 2008 http://en.wikipedia.org/wiki/Optical_comparator.

* cited by examiner

*Primary Examiner* — Viet Vu
(74) *Attorney, Agent, or Firm* — Klintworth & Rozenblat IP LLC

(57) ABSTRACT

An apparatus for evaluating a part may include a camera, a camera-holding member for holding the camera in place relative to the part being evaluated, and an indexing surface disposed in a fixed position relative to the camera-holding member. The camera may be positioned to take a simultaneous picture of both the indexing surface and the part in order to evaluate the part using the picture by comparing an indexing surface image with a part image.

25 Claims, 3 Drawing Sheets

CAMERA-HOLDING APPARATUS FOR EVALUATING PARTS

BACKGROUND

Evaluations of parts are often needed. For instance, the edges of composite parts, metal parts, and/or other types of parts may need to be analyzed in order to determine measurements, data, and/or other information regarding the parts. One prior art method requires the operator to hold a scale in one hand and a camera in the other hand to take a picture or both the part and the scale to later analyze the part based on the picture image. However, this method leaves no hands for stabilization, and because the scale is held separately, it may be positioned in an incorrect position relative to the part being measured. Moreover, because scales may be different, the units of measurement may be confused leading to mistakes in the analysis. During this process, the scale may be inadvertently dropped into a location where it cannot be recovered which may cause damage to the device containing the part. The camera may be rested against the part when the picture is taken to prevent the camera from moving thereby blurring the picture. However, because the magnification of the camera may be set based on the distance of the camera away from the part, placing the camera against the part may require a high magnification. Due to the high magnification, several pictures may need to be taken of the part and the scale at slightly different locations, and subsequently the pictures may need to be stitched together. Other prior art methods and/or apparatus may contain one or more differing problems.

An apparatus and/or method for evaluating a part is needed to decrease one or more problems associated with one or more of the existing apparatus and/or methods.

SUMMARY

In one embodiment, an apparatus for evaluating a part is provided. The apparatus may include a camera, a camera-holding member for holding the camera in place relative to a part being evaluated, and an indexing surface disposed in a fixed position relative to the camera-holding member. The camera may be positioned to take a simultaneous picture of both the indexing surface and the part in order to evaluate the part using the picture by comparing an indexing surface image with a part image.

In another embodiment, a method is disclosed of evaluating a part. In one step an apparatus may be provided comprising a camera, a camera-holding member holding the camera, and an indexing surface disposed in a fixed position relative to the camera-holding member. In another step, the indexing surface may be positioned at least one of against and near the part. In still another step, a picture may be taken to include both a part image and an indexing surface image using the camera. In an additional step, the picture may be evaluated by comparing the part image with the indexing surface image.

These and other features, aspects and advantages of the disclosure will become better understood with reference to the following drawings, description and claims.

DETAILED DESCRIPTION

The following detailed description is of the best currently contemplated modes of carrying out the disclosure. The description is not to be taken in a limiting sense, but is made merely for the purpose of illustrating the general principles of the disclosure, since the scope of the disclosure is best defined by the appended claims.

Figure 1:
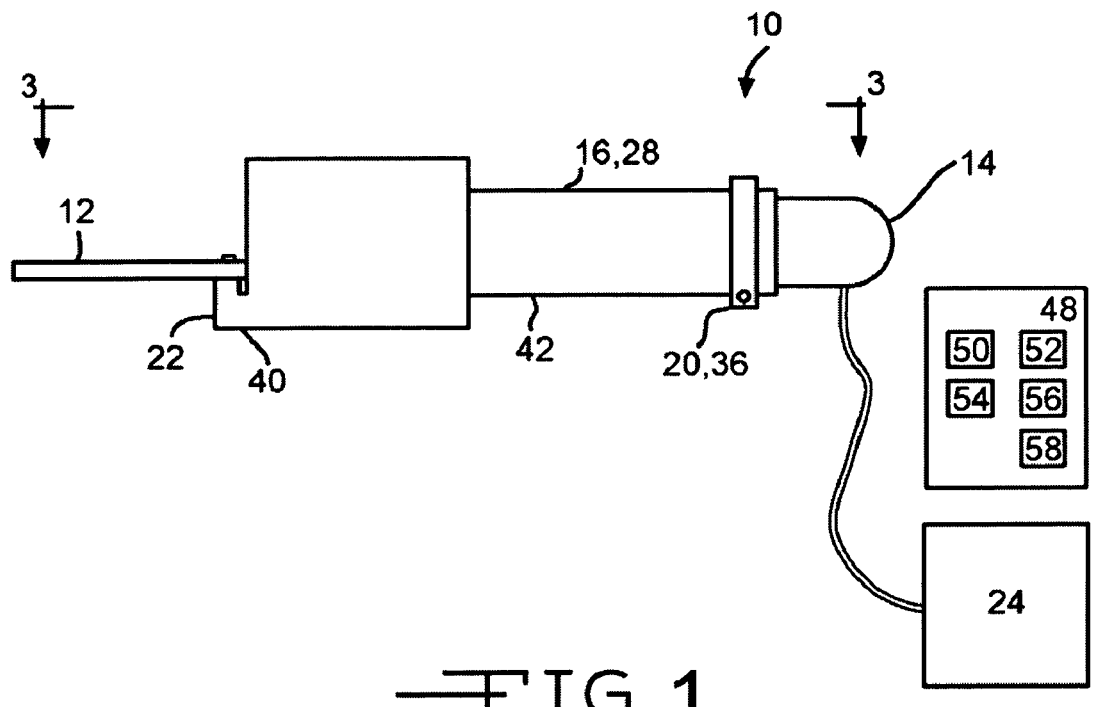
FIG. 1 shows a side-view of one embodiment of an apparatus for evaluating a part.
Figure 2:
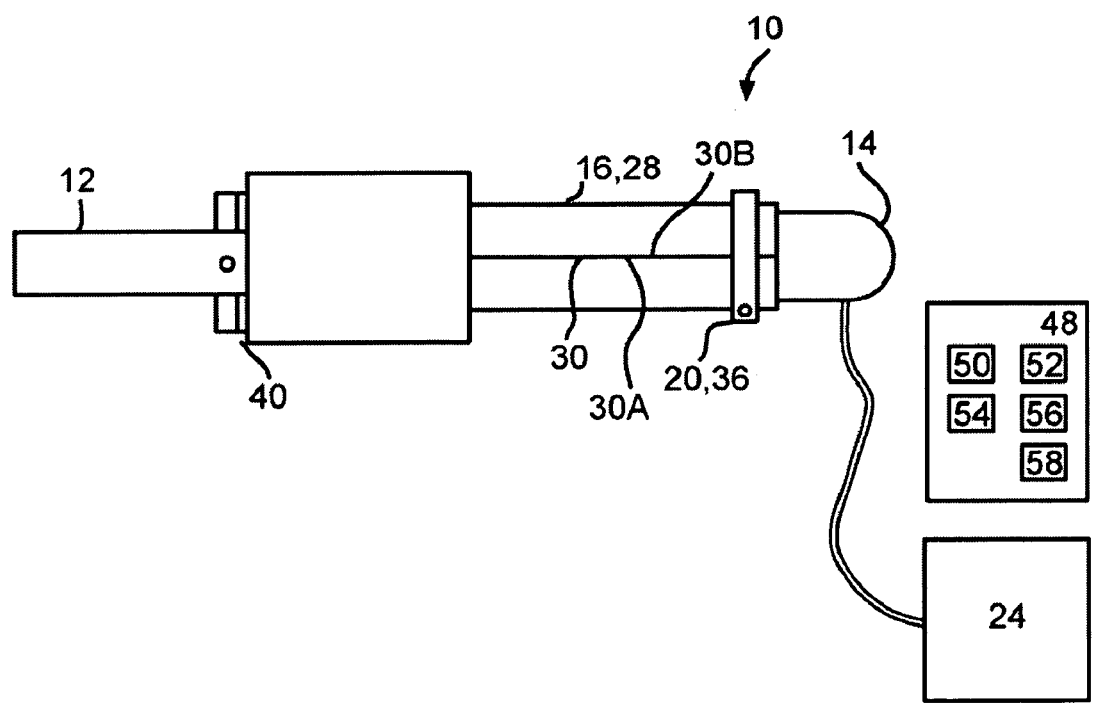
FIG. 2 shows a top-view of the apparatus of FIG. 1.
Figure 3:
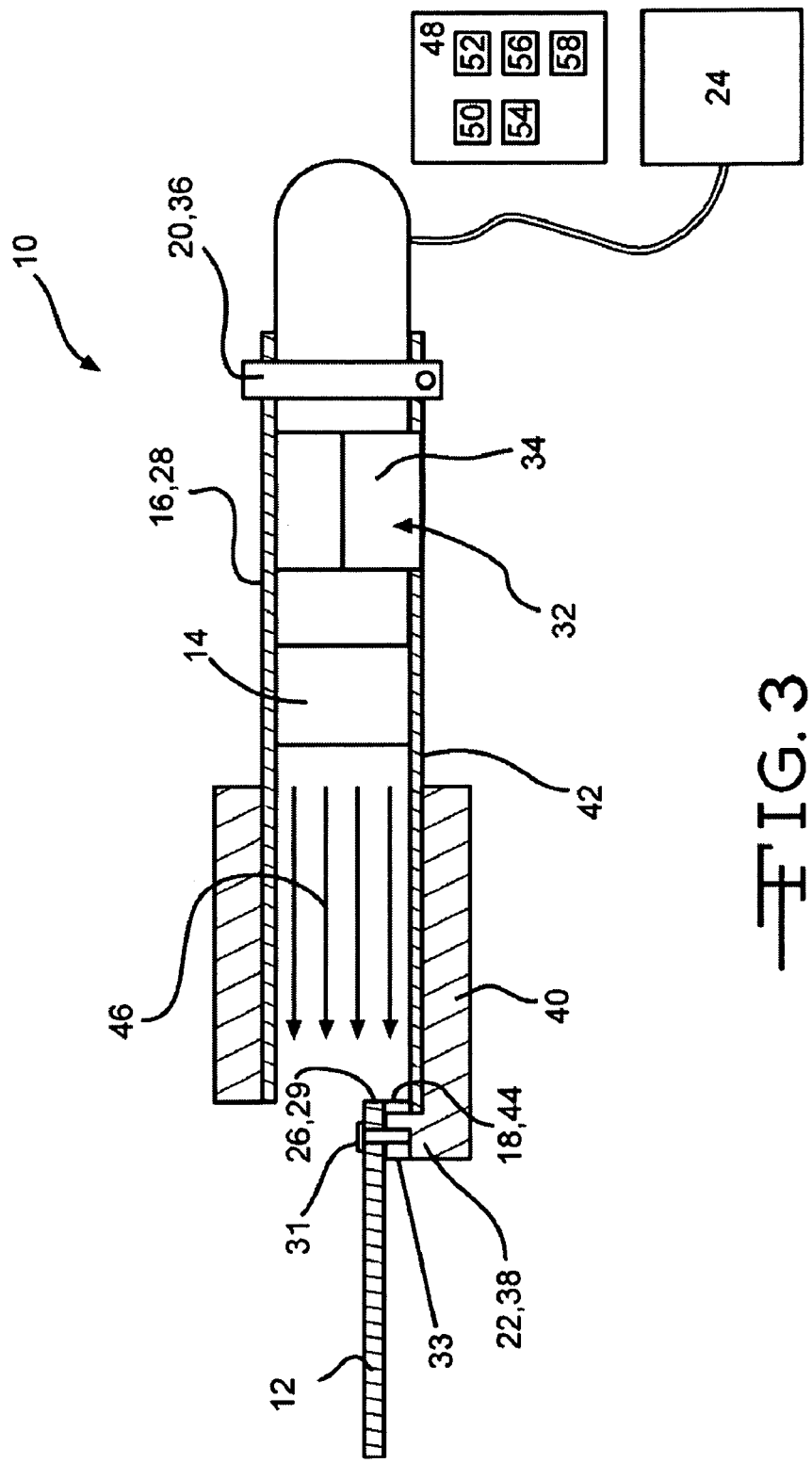
FIG. 3 shows a cut-away view along line 3-3 of the apparatus of FIG. 1 to show a cross-section view.

FIG. 1 shows a side-view of one embodiment of an apparatus 10 for evaluating a part 12. FIG. 2 shows a top-view of the apparatus 10 of FIG. 1. FIG. 3 shows a cut-away view along line 3-3 of the apparatus of FIG. 1 to show a cross-section view. The apparatus 10 may comprise a camera 14, a camera-holding member 16, an indexing surface 18, a securing member 20, a part-alignment surface 22, and a computer 24. The part 12 being evaluated may comprise a composite part, advanced composite part, metal bond part, carbon-carbon part, ceramic matrix composite part, metal part, metal composite hybrid part, or other type of part that requires surface and/or edge evaluation in an airplane or other type of non-airplane structure. A surface 26 of the part 12 may be evaluated using the apparatus 10. The surface 26 being evaluated may comprise an edge 29 of the part 12. In other embodiments, varying surfaces of the part 12 may be evaluated using the apparatus 10.

The camera 14 may comprise a digital camera, infrared camera, ultra violet camera, borescope camera, subatomic particle detector camera, Compton backscatter gamma ray imaging camera, and/or other type of camera The camera-holding member 16 may be used to hold the camera 14 in place relative to the part 12 being evaluated. The camera-holding member 16 may comprise an open tube 28 and the camera 14 may be slideably-disposed within the tube 28. In other embodiments, the camera-holding member 16 may vary in type, size, shape, configuration, and/or orientation, and the camera 14 may be disposed in varying positions and/or configurations relative to the camera-holding member 16. The camera-holding member 16 may comprise a slot 30 to allow the tube 28 to be tightened against the camera 14 disposed within the camera-holding member 16.

The camera-holding member 16 may have an opening 32 for accessing a focus adjustment 34 of the camera 14 in order to focus the camera 14. The securing member 20 may be moveably attached to the camera-holding member 16 for securing the camera 14 in place relative to the camera-holding member 16. The securing member 20 may comprise a pivotally-disposed clamp 36, which when positioned over the tube 28 may compress the edges 30A and 30B of the slot 30 of the tube 28 against one another to hold the tube 28 firmly against the camera 14. In other embodiments, the securing member 20 may vary in structure and function. The camera 14 may be removed from the camera-holding member 16 by releasing the securing member 20, and slideably removing the camera 14 from within the camera-holding member 16.

The part-alignment surface 22 may be disposed in a fixed position relative to the camera-holding member 16. The part-alignment surface 22 may comprise a portion 38 of a tube 40 attached to the camera-holding member 16. The part-alignment surface 22 may be disposed substantially perpendicular to an outer surface 42 of the camera-holding member 16. The part-alignment surface 22 may be aligned against the part 12 in order to position the part 12 in a good picture-taking position relative to the camera 14. In other embodiments, the part-alignment surface 22 may be of various types, shapes, sizes, orientation, and/or configurations. In still other embodiments, the part-alignment surface 22 may be aligned near the part 12 and/or in varying configurations relative to the part 12. The part-alignment surface 22, the camera-holding member 16, and/or the apparatus 10 may be adapted to be attached to the part 12 using an attachment member 31 such as a clamp, spring, pin, and/or other type of attachment member 31. A global positioning system (GPS) chip 33 may be disposed in the part-alignment surface 22, the camera-holding member 16, and/or another part of the apparatus 10. The GPS chip 33 may be adapted to send information to the computer 24 to provide location and/or map location regarding the part 12.

The indexing surface 18 may be disposed in a fixed-position 44 relative to the camera-holding member 16 in a field of view 46 of the camera 14. The indexing surface 18 may be attached to the camera-holding member 16 and/or to the part-alignment surface 22. The indexing surface 18 may comprise a measuring device such as a scale, ruler, or other type of measuring device. The camera 14 may be positioned to take a simultaneous picture 48 of both the indexing surface 18 and the part 12 in order to evaluate the part 12 using the picture 48.

The camera 14 may be in communication with the computer 24, and may digitally send the picture 48 to the computer 24 for evaluation of the picture 48 by the computer 24. This evaluation may be done by comparing an indexing surface image 50 in the picture 48 with a part image 52 in the picture 48. In such manner, information regarding the part 12 may be determined such as a quantity of plies 54 in the part 12, data regarding wrinkles 56 of the part 12, measurements 58 of the part 12 by comparing the part image 52 with the indexing surface image 50, defect information, edge 29 information, surface information, and/or other type of information regarding the part 12.

Figure 4:
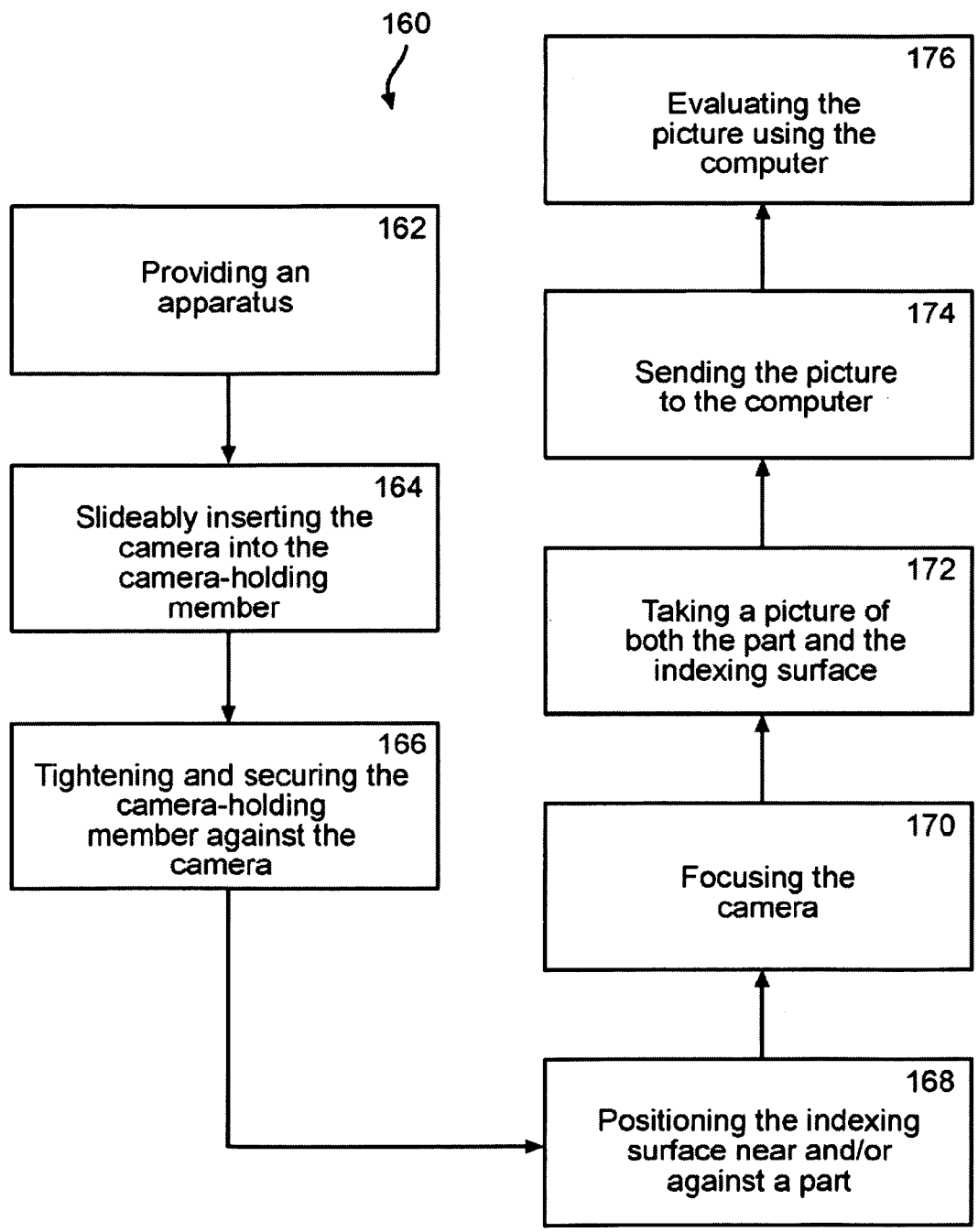
FIG. 4 is a flowchart of one embodiment of a method for evaluating a part.

FIG. 4 is a flowchart of one embodiment of a method 160 under the disclosure for evaluating a part 12. The part 12 being evaluated may comprise a composite part, advanced composite part, metal bond part, carbon-carbon part, ceramic matrix composite part, metal part, metal composite hybrid part, or other type of part that requires surface and/or edge evaluation in an airplane or other type of non-airplane structure. A surface 26 of the part 12 may be evaluated. The surface 26 being evaluated may comprise an edge 29 of the part 12. In other embodiments, varying surfaces of the part 12 may be evaluated. In still other embodiments, the part 12 may comprise various types of parts.

In step 162, an apparatus 10 may be provided. The apparatus 10 may comprise a camera 14, a camera-holding member 16, an indexing surface 18, a securing member 20, a part-alignment surface 22, and a computer 24. The camera 14 may comprise a digital camera and may have a focus adjustment 34. In other embodiments, the camera 14 may comprise varying types of cameras. The camera-holding member 16 may comprise an open tube 28, a slot 30, and an opening 32. In other embodiments, the camera-holding member 16 may vary in type, size, shape, configuration, and/or orientation. The indexing surface 18 may be disposed in a fixed-position 44 relative to the camera-holding member 16. The indexing surface 18 may be attached to the camera-holding member 16 and/or to the part-alignment surface 22. The indexing surface 18 may comprise a measuring device such as a scale, ruler, or other type of measuring device. In other embodiments, the indexing surface 18 may comprise varying types of indexing devices. The securing member 20 may comprise a pivotally-disposed clamp 36. In other embodiments, the securing member 20 may vary in structure and function. The part-alignment surface 22 may be disposed in a fixed position relative to the camera-holding member 16. The part-alignment surface 22 may comprise a portion 38 of a tube 40 attached to the camera-holding member 16. The part-alignment surface 22 may be disposed substantially perpendicular to an outer surface 42 of the camera-holding member 16. In other embodiments, the part-alignment surface 22 may be of various types, shapes, sizes, orientation, and/or configurations.

In step 164, the camera 14 may be slideably inserted into the camera-holding member 16. The camera 14 may be inserted into the camera-holding member 16 so that the camera 14 is pointed towards the indexing surface 18. The magnification of the camera 14 may be adjusted by adjusting the position of the camera 14 in the camera-holding member 16. In step 166, the camera-holding member 16 may be tightened and secured against the camera 14. This may be done by pivoting the securing member 20 over the camera-holding member 16 in order to compress the edges 30A and 30B of the slot 30 of the tube 28 against one another to hold the tube 28 firmly against the camera 14. The distance between edges 30A and 30B may be optimized based on the force required to secure the camera 14 without damaging the camera 14 by excessive force.

In step 168, the indexing surface 18 may be positioned near and/or against the part 12 in order to position the part 12 in a good position for taking a picture 48. This may be done by aligning the part alignment surface 22 against the part 12. In step 170, the focus adjustment 34 of the camera 14 may be adjusted through the opening 32 to put the camera 14 into focus with the part 12 and the indexing surface 18. In step 172, a picture 48 may be taken using the camera 14 to include both a part image 52 and an indexing surface image 50 of the part 12. In step 174, the camera 14 may send the picture 48 to the computer 24. In step 176, the picture 48 may be evaluated using the computer 24 by comparing the part image 52 with the indexing surface image 50. The evaluating step may determine at least one of a quantity of plies 54 of the part 12, wrinkle 56 data regarding the part 12, measurements 58 of the part 12, defect information, edge 29 information, surface information, and/or other type of information regarding the part 12.

One or more embodiments of the disclosure may reduce and/or eliminate one or more problems of one or more of the existing part evaluation apparatus and/or methods of use. For instance, one or more embodiments of the disclosure may provide for an adjustable camera-holding member 16 for aligning and subsequently holding a camera 14 in a fixed, stable position relative to the part 12. The indexing surface 18 may be disposed in a fixed, stable position relative to both the camera-holding member 16 and camera 14 to allow one picture to be taken of both the part 12 and the indexing surface 18 in order to evaluate the part 12. The camera-holding member 16 may allow the focus 34 of the camera 14 to easily be adjusted. In such manner, evaluations of a part 12 may be made more efficiently, with reduced cost, with higher accuracy, and/or with reduced likelihood of damage to the part being analyzed.

It should be understood, of course, that the foregoing relates to exemplary embodiments of the disclosure and that modifications may be made without departing from the spirit and scope of the disclosure as set forth in the following claims.

We claim:

1. An apparatus comprising a first tube for holding a camera, an indexing surface for measuring a part, and a second tube for holding the part, wherein the first tube, the indexing surface, and the second tube are in one state attached in fixed positions relative to one another with the indexing surface attached to the first tube or to the second tube and the second tube attached to the first tube.

2. The apparatus of claim 1 further comprising a camera held by the first tube, wherein the camera, the first tube, the indexing surface, and the second tube are in the one state attached in fixed positions relative to one another.

3. The apparatus of claim 2 wherein the first tube is positioned so that the camera will take a picture which includes both the indexing surface and the part.

4. The apparatus of claim 1 wherein the first tube comprises a slot.

5. The apparatus of claim 1 wherein the first tube has a focus adjustment opening.

6. The apparatus of claim 1 wherein the first tube comprises a securing member for securing the camera in place relative to the first tube.

7. The apparatus of claim 6 wherein the securing member comprises a clamp.

8. The apparatus of claim 3 further comprising a computer, wherein the camera is in communication with the computer to send the picture to the computer in order to evaluate the part relative to the indexing surface.

9. The apparatus of claim 1 wherein the indexing surface comprises a scale.

10. The apparatus of claim 1 further comprising an attachment member for attaching the apparatus to the part.

11. The apparatus of claim 1 further comprising a global positioning system chip for determining a location of the part.

12. A method of evaluating a part comprising:
providing an apparatus comprising a camera, a first tube holding the camera, a second tube, and an indexing surface, each in one state attached in fixed positions relative to one another with the indexing surface attached to the first tube or to the second tube and the second tube attached to the first tube;
positioning a part against the second tube;
taking a picture with the camera to include both the part and the indexing surface; and
evaluating the picture by comparing the part with the indexing surface in the picture.

13. The method of claim 12 wherein the evaluating the picture comprises determining at least one of a quantity of plies of the part, wrinkle data regarding the part, measurements of the part, edge information of the part, or surface information of the part.

14. The method of claim 12 further comprising slideably-disposing the camera into the first tube.

15. The method of claim 14 wherein the first tube comprises a slot, and further comprising tightening the first tube against the camera by compressing edges of the slot.

16. The method of claim 12 wherein the first tube has an opening, and further comprising adjusting the focus of the camera through the opening.

17. The method of claim 12 wherein the first tube is attached to a securing member, and further comprising securing the camera in place relative to the first tube using the securing member.

18. The method of claim 17 wherein the securing member comprises a clamp.

19. The method of claim 12 wherein the apparatus further comprises a computer, and further comprising the camera sending the picture to the computer and evaluating the picture using the computer.

20. The method of claim 12 wherein the indexing surface comprises at least one of a measuring device or a scale.

21. The method of claim 12 wherein the apparatus further comprises an attachment member, and further comprising attaching the part to the apparatus using the attachment member.

22. The method of claim 12 wherein the apparatus further comprises a global positioning system chip, and further comprising determining a location of the part using the global positioning chip.

23. An apparatus comprising a camera-holding member holding a camera, an indexing surface for measuring a part, a part-alignment surface for holding the part, and a global positioning system chip for determining a location of the part, wherein the camera-holding member, the camera, the indexing surface, and the part-alignment surface are in one state attached in fixed positions relative to one another with the indexing surface attached to the camera-holding member or to the part-alignment surface and the part-alignment surface attached to the camera-holding member, the apparatus for taking a picture, using the camera, of both the part and the indexing surface.

24. The apparatus of claim 23 wherein the camera-holding member comprises a first tube.

25. The apparatus of claim 24 wherein the part-alignment surface comprises a second tube.

* * * * *